UNITED STATES PATENT OFFICE 2,348,044

COMPOSITION USEFUL AS ADDITIVE TO MINERAL OIL LUBRICANTS AND METHOD OF PREPARING AND USING THE SAME

William A. Whittier, Kenilworth, and Joseph B. Stucker, Chicago, Ill., assignors to The Pure Oil Company, Chicago, Ill., a corporation of Ohio No Drawing. Application November 22, 1940, Serial No. 366,710

17 Claims. (Cl. 252—47)

This invention relates to compositions useful as additives to mineral oil lubricants and to method of preparing and using the same.

Various types of sulfur, chlorine, nitrogen, oxygen and phosphorus-containing compounds have been proposed as lubricating oil additives for the purpose of increasing load carrying characteristics and/or stability of the lubricant.

We have discovered that organic compounds containing nitrogen, sulfur, phosphorus and either or both oxygen and halogen, and particularly acid amides both substituted and unsubstituted which have been sulfurized or sulfurchlorinated, and then phosphorized, have superior load carrying characteristics to known additives of equal stability and non-corrosiveness.

In accordance with this invention, substituted or unsubstituted acid amides are first sulfurized by reacting the same with either sulfur and/or sulfur chloride until a product which is non-corrosive results. This product is then phosphorized by reaction with phosphorus or active phosphorus-containing material in the manner disclosed for phosphorizing sulfurized fatty oil in the patent to Whittier et al. No. 2,211,306. The resulting product not only has a high Timken load test, but also satisfies the requirements of the S. A. E. testing machine. In addition to its load carrying ability, the product functions as a stabilizer to prevent or inhibit oxidation of the mineral oil lubricant.

Instead of sulfurizing or sulfur-chlorinating and/or phosphorizing the acid amide, the organic acid may first be sulfurized or sulfurchlorinated and/or phosphorized and the resulting product converted to a substituted or unsubstituted acid amide in the usual way. In this way reaction within the amido group is eliminated.

In preparing compositions in accordance with our invention a substituted or unsubstituted acid amide may be used, corresponding to the formula

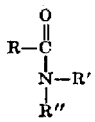

in which R is a saturated or unsaturated aliphatic radical, and R' and R'' are either hydrogen, alkyl, aryl, or aralkyl groups. As examples, amide of palmitic, stearic and oleic acids may be mentioned as well as those of lower boiling acids such as butyric, valeric and caproic. Substituted or unsubstituted amides of diabasic acids, preferably oil soluble amides, such as those of maleic acid, may also be used.

In preparing the additives, the acid amide or substituted acid amide may be reacted with sulfur alone or with sulfur chloride and sulfur in the manner set forth in Patent No. 2,211,306. Although sulfur alone may be used as a source of sulfur, it is preferable to first mix the amide with a small amount of sulfur chloride mixed with mineral oil as set forth in the aforesaid patent and agitate the mixture of the amide and sulfur chloride until the exothermic reaction has ceased. The temperature should be kept below 150° F. during this period. Sulfur is then mixed with the amide-sulfur chloride product and the temperature raised gradually to a maximum of about 340° F. and the temperature maintained at this level with constant stirring until material shows no copper-strip corrosion. The amount of sulfur which should be used is the same as that disclosed in the aforesaid patent, namely, 5% to 10% based on the weight of the amide. The time required to obtain the required copper-strip corrosion will vary with the amount of sulfur used. In one case where 7½% by weight of sulfur based on the amide was added, the material required nine hours cooking at 325° F. to obtain a good corrosion test.

An additive superior in load carrying characteristic to that made in the manner just described may be prepared by substituting sulfur chloride for the sulfur in the reaction. In such cases, the sulfur chloride in an amount not in excess of 15% by weight of the amide is gradually added to the amide with constant stirring over a sufficient period of time so that the exothermic reaction is not permitted to rise above 150° F. By preventing rise of temperature above this point both the sulfur and chlorine are chemically combined with the amide and remain in chemical combination in the final product. If the temperature is permitted to rise materially above this level, part or all of the chlorine escapes and undesirable polymerization reactions occur.

When the sulfur chloride is used as a source of sulfur, the amount should not exceed approximately 15% by weight of the amide since larger amounts tend to cause undesirable polymerization and have an unfavorable effect upon the finished product. After all of the sulfur chloride has been added, the temperature of the material or reaction product is gradually raised to approximately 280° F. and held at this temperature with constant stirring until a good copper-strip corrosion is obtained. The time required for the cooking will vary with the amount of sulfur chloride used but generally the time required is shorter than that in the case where sulfur alone is used as the reactant. Sufficient sulfur chloride should be used so that the percentage of sulfur and chlorine in the finished product will equal at least approximately 5% of each.

The product made using sulfur chloride as a reactant has superior load carrying characteristics to that obtained by using sulfur as the reactant, probably due to the chlorine chemically combined in the product.

The product prepared by either reaction of the amide with either sulfur and/or sulfur chloride is next phosphorized with phosphorus or a reactive phosphorus compound in the manner set forth in the aforesaid Patent No. 2,211,306, although we prefer to use phosphorus sesquisulfide as the source of phosphorus. Bi-elemental phosphorus compounds such as the halides, oxy-halides, oxides and phosphides may be used. The amount of phosphorus or phosphorus compound used should be sufficient to give a resulting product containing approximately 0.1% to 0.5% by weight of phosphorus.

When using phosphorus sesquisulfide we have found that approximately 0.4% by weight thereof based on the sulfurized or sulfur halogenated acid amide gives excellent results. After the addition of the phosphorus or phosphorus compound, the material is stirred and maintained at a temperature of 220° to 230° F. until no fuming of the material takes place when the temperature is raised to approximately 350° F. A period of two to ten hours may be required to obtain a stable product which is not corrosive. The reaction product is quickly cooled at the end of the reaction period to a temperature of approximately 130° F. or lower but sufficiently high to permit the material to be pumped to storage.

Although it is not certain in what manner sulfur, chlorine and phosphorus combine with the acid amide, it is believed that the sulfur unites with the carbon at the point of unsaturation or substitutes for hydrogen in the aliphatic chain. Reaction in the amido group may also take place particularly where the hydrogen in the amido group is not substituted.

If the amide is sulfur-chlorinated it is preferable to use the substituted amides, that is, acid amide in which either or both of the hydrogen atoms in the amido group are substituted by aryl or alkyl group, for the reason that the unsubstituted amides tend to polymerize during sulfur-chlorination.

The following example is given showing the manner of preparation and test on products in accordance with our invention:

*Example.*—Oleic acid was treated with thionyl chloride to form the acid chloride. The acid chloride was then treated with aniline to form the anilide of the oleic acid. This substituted acid amide was then treated with 12% by weight of sulfur monochloride and kept at a temperature of 150° F. until the sulfur monochloride was all added. The temperature was then increased to 280° F. and held at this temperature for one hour while the material was constantly stirred. The resulting product showed a good copper-strip corrosion. This material was then cooled to about 225° F. and heated with 0.4% by weight of phosphorus sesquisulfide at 225° F. for five hours and cooled. When heated to 350° F. the product did not fume. When 18% by volume of this product was blended with Gulf Coast mineral lubricating oil having a viscosity of 60-65 at 210° F. Saybolt Universal, the blend showed a Timken test of 59 lbs. beam load and 30,250 lbs. per square inch. On the S. A. E. testing machine, the blend carried a load of 330 lbs. at 1000 R. P. M. The load carrying capacity of the oil without the addition of the additive was less than 9000 lbs. per square inch on the Timken machine or approximately 15 lbs. on the S. A. E. machine at 1000 R. P. M.

The novel additives made in accordance with our invention may be used per se as lubricants but are preferably added to mineral lubricating oils in amounts of 10-25% by volume to impart thereto stability and high load carrying ability, and in amounts of .1 to 2% when added to lubricants only to impart thereto stability and non-corrosiveness.

It will be seen that in accordance with our invention, compositions containing sulfur, phosphorus and nitrogen in chemical combination together with chlorine or other halogen and/or oxygen are prepared which exhibit a high degree of stability in use and which exhibit unusually high load carrying characteristics without being corrosive to metallic parts under the conditions of use.

The compositions prepared in accordance with our invention also have the ability, when added to mineral oil lubricants in small quantities, to act as stabilizing agents and to inhibit corrosion of metallic surfaces and bearings which would otherwise be corroded by the lubricant.

We claim:

1. A composition of matter comprising an acid amide which has been sulfurized at an elevated temperature sufficient to give a good copper strip corrosion but not above approximately 280° F. then phosphorizing the sulfurized amide at a temperature of approximately 220–230° F. for a period of time sufficient to avoid fuming when the composition is heated to 350° F.

2. Composition in accordance with claim 1 in which the amide is sulfurized by means of a material selected from the group of sulfur and sulfur chlorides.

3. A composition in accordance with claim 1 in which the composition is phosphorized by means of phosphorus sesquisulfide.

4. A composition in accordance with claim 1 in which the amide is sulfurized by means of a material selected from the group consisting of sulfur and sulfur chlorides and the sulfurized amide is phosphorized by means of phosphorus sesquisulfide.

5. Composition in accordance with claim 1 containing between 5–10% by weight of sulfur and between 0.1–0.5% by weight of phosphorus.

6. A lubricant comprising a major portion of mineral lubricating oil and a minor portion of the composition defined by claim 1.

7. The method of inhibiting corrosion of metallic parts by mineral oil lubricants which normally corrode such parts, which comprises contacting said parts in the presence of such lubricant with a small amount of the composition of claim 1.

8. A composition of matter comprising an acid amide which has been sulfur-chlorinated under such conditions as to avoid polymerization and to give a good copper strip corrosion and then phosphorizing the resulting product by means of phosphorus sesquisulfide at temperature of about 220–230° F. for a period of time sufficient to avoid fuming when the composition is heated to 350° F.

9. Composition in accordance with claim 8 containing between 5–10% by weight of sulfur, 0.1–0.5% by weight of phosphorus and 5–8% by weight of chlorine.

10. A lubricant comprising a major portion of mineral lubricating oil and a minor portion of the composition defined by claim 8.

11. The method of inhibiting corrosion of metallic parts by mineral oil lubricants which normally corrode such parts, which comprises contacting said parts in the presence of such lubricant with a small amount of the composition of claim 8.

12. The method of preparing a composition for use as a lubricant which comprises sulfurizing an acid amide at temperatures sufficiently high to obtain a good copper strip corrosion but not in excess of approximately 280° F., then phosphorizing the sulfurized amide at temperatures between approximately 220 and 230° F. until the product does not fume at 350° F.

13. Method in accordance with claim 12 in which the amide is sulfurized by means of a sulfur chloride.

14. Method in accordance with claim 12 in which the sulfurized amide is phosphorized by means of phosphorus sesquisulfide.

15. Method in accordance with claim 12 in which the amide is sulfurized by means of a material selected from the group consisting of sulfur and sulfur chlorides and the sulfurized amide is phosphorized by means of phosphorus sesquisulfide.

16. Composition in accordance with claim 1 in which the acid amide contains substituents selected from the group consisting of aryl or alkyl radicals, substituted for hydrogen in the amido group, and the acid amide has been sulfurized by means of a sulfur chloride.

17. Composition in accordance with claim 1 in which the acid amide is the anilide of oleic acid and it has been sulfurized with about 12% by weight of sulfur monochloride and phosphorized with 0.4% by weight of phosphorus sesquisulfide.

WILLIAM A. WHITTIER.
JOSEPH B. STUCKER.